United States Patent
Ong et al.

(10) Patent No.: US 9,079,979 B2
(45) Date of Patent: Jul. 14, 2015

(54) PROCESS FOR THE PREPARATION OF HYDROGENATED NITRILE RUBBER

(75) Inventors: Christopher Ong, Orange, TX (US); Julia Maria Mueller, Gilgenberg (AT)

(73) Assignee: LANXESS DEUTSCHLAND GMBH, Cologne (DE)

( * ) Notice: Subject to any disclaimer, the term of this patent is extended or adjusted under 35 U.S.C. 154(b) by 431 days.

(21) Appl. No.: 13/391,633

(22) PCT Filed: Aug. 27, 2010

(86) PCT No.: PCT/EP2010/062529
§ 371 (c)(1), (2), (4) Date: Sep. 17, 2012

(87) PCT Pub. No.: WO2011/023788
PCT Pub. Date: Mar. 3, 2011

(65) Prior Publication Data
US 2012/0329954 A1 Dec. 27, 2012

(30) Foreign Application Priority Data
Aug. 31, 2009 (EP) .................... 09169059

(51) Int. Cl.
*C08C 19/02* (2006.01)
*B01J 31/18* (2006.01)
*B01J 31/22* (2006.01)
*C08C 19/08* (2006.01)
*C08L 15/00* (2006.01)
*C08C 19/00* (2006.01)

(52) U.S. Cl.
CPC ............. *C08C 19/02* (2013.01); *B01J 31/181* (2013.01); *B01J 31/1815* (2013.01); *B01J 31/2265* (2013.01); *B01J 31/2291* (2013.01); *C08C 19/08* (2013.01); *C08L 15/005* (2013.01); *B01J 2231/641* (2013.01); *B01J 2531/821* (2013.01); *B01J 2531/825* (2013.01); *C08C 2019/09* (2013.01)

(58) Field of Classification Search
None
See application file for complete search history.

(56) References Cited

U.S. PATENT DOCUMENTS

| | | | |
|---|---|---|---|
| 5,208,296 A | 5/1993 | Rempel et al. | |
| 5,210,151 A | 5/1993 | Rempel et al. | |
| 5,258,647 A | 11/1993 | Wojnarowski et al. | |
| 6,838,489 B2 | 1/2005 | Bell et al. | |
| 7,585,920 B2 | 9/2009 | Guerin | |
| 7,598,330 B2 | 10/2009 | Grubbs et al. | |
| 8,362,154 B2 * | 1/2013 | Ong et al. | 525/329.1 |
| 2008/0214741 A1 * | 9/2008 | Guerin | 525/329.1 |
| 2009/0054597 A1 | 2/2009 | Ong et al. | |
| 2009/0069516 A1 * | 3/2009 | Obrecht et al. | 526/126 |
| 2009/0076226 A1 | 3/2009 | Meca et al. | |
| 2009/0076227 A1 | 3/2009 | Obrecht et al. | |

OTHER PUBLICATIONS

Rempel, G.L., "Chemical Modification of Polymers: Catalytic Hydrogenation and Related Reactions" Journal of Macromolecular Science—Part C—Polymer Reviews, 1995, Vo. C35, pp. 235-285.
Sivaram, S., "Hydrogenation of Diene Elastomers, Their Properties and Applications: A Critcal Review", Rubber Chemistry and Technology, Jul./Aug. 1997, vol. 70, Issue 3, p. 309-367.
Souza, Roberto, "Catalytic Hydrogenation of Nitrile Rubber Using Palladium and Ruthenium Complexes" Journal of Applied Polymer Science, 2007, vol. 106, pp. 659-663.
Sanford, M., "A Versatile Precursor for the Synthesis of New Ruthenium Olefin Metathesis Catalysts", Organometallics 2001, 20, pp. 5314-5318.
Grela, K., "A Highly Efficient Ruthenium Catalyst for Metathesis Reactions", Angew. Chem. Int. Ed. 2002, 41, No. 21, p. 4038.
International Search Report from co-pending Application PCT/EP2010/062529 dated Sep. 30, 2010, 2 pages.

* cited by examiner

Primary Examiner — Robert C Boyle

(57) ABSTRACT

The present invention relates to a process for the production of hydrogenated nitrile rubber polymers having lower molecular weights and narrower molecular weight distributions than those known in the art, wherein the process is carried out in the presence of hydrogen and optionally at least one co-olefin. The present invention further relates to the use of specific metal compounds in a process for the production of a hydrogenated nitrile rubber by simultaneous hydrogenation and metathesis of a nitrile rubber.

14 Claims, No Drawings

PROCESS FOR THE PREPARATION OF HYDROGENATED NITRILE RUBBER

The present invention relates to a process for the production of hydrogenated nitrile rubber polymers having lower molecular weights and narrower molecular weight distributions than those known in the art, wherein the process is carried out in the presence of hydrogen and optionally at least one co-(olefin). The present invention further relates to the use of specific metal compounds in a process for the production of a hydrogenated nitrile rubber by simultaneous hydrogenation and metathesis of a nitrile rubber.

Hydrogenated nitrile rubber (HNBR), prepared by the selective hydrogenation of acrylonitrile-butadiene rubber (nitrile rubber; NBR, a co-polymer comprising at least one conjugated diene, at least one unsaturated nitrile and optionally further co-monomers), is a specialty rubber which has very good heat resistance, excellent ozone and chemical resistance, and excellent oil resistance. Coupled with the high level of mechanical properties of the rubber (in particular the high resistance to abrasion) it is not surprising that HNBR has found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 34 to 130, a molecular weight in the range of from 150,000 to 500,000 g/mol, a polydispersity in the range of from 2.0 to 5.0 and a residual double bond (RDB) content in the range of from <1 to 18% (by IR spectroscopy).

As outlined in independent reviews by Rempel (Journal of Macromolecular Science—Part C—Polymer Reviews, 1995, Vol. C35, 239-285) and Sivaram (Rubber Chemistry and Technology, July/August 1997, Vol. 70, Issue 3, 309), the bulk of the catalytic work concerning dienes and in particular nitrile butadiene rubber has been focused on the transition metals rhodium (Rh) and palladium (Pd). However considerable efforts have also gone into the exploration of alternative catalytic systems including iridium and Ziegler-Type catalysts. Alternatively efforts into developing ruthenium (Ru) based catalyst have attracted attention. These ruthenium based catalyst were of the general form $RuCl_2(PPh_3)_3$, $RuH(O_2CR)(PPh_3)_3$ and $RuHCl(CO)(PPh_3)_3$. One negative to the utilization of a ruthenium based catalyst was the unusually high Mooney viscosity for the resulting hydrogenated nitrile rubber due to the reduction of the nitrile groups to secondary amines, resulting in the subsequent crosslinking/gelling of the polymer. Rempel does point out that the addition of additives (i.e. $CoSO_4$ and $(NH_4)_2Fe(SO_4)_4$) to react with these amines can minimize the crosslinking/gelling.

Rempel and co-workers reported in a series of patents (U.S. Pat. Nos. 5,210,151; 5,208,296 and 5,258,647) the utilization of ruthenium based catalyst for the hydrogenation of nitrile rubber when the nitrile rubber was supplied in an aqueous, latex form and when the reactions were conducted in the presence of additives which were capable for minimalizing the reduction of the nitrile group. Specific ruthenium catalyst utilized include carbonylchlorohydrido bis(tricyclohexylphosphine) ruthenium II, dichloro tris(triphenylphosphine) ruthenium II, carbonylchlorostyrly bis(tricyclohexylphosphine) ruthenium II and carbonylchlorobezoato bis(tricyclohexylphosphine) ruthenium II.

Recently, Souza and co-workers reported (Journal of Applied Polymer Science, 2007, Vol. 106, pg 659-663) the hydrogenation of a nitrile rubber using a ruthenium catalyst of the general form $RuCl_2(PPh_3)_3$. While efficient hydrogenation was reported restrictions were placed on the solvent choice due to the necessity to minimize the nitrile group reduction.

The problem of reducing the molecular weight of a nitrile rubber is solved in the more recent prior art prior to hydrogenation by metathesis. Metathesis catalysts are known in the prior art.

WO-A1-03/011455 relates to hexacoordinated metathesis catalysts and to methods of making and using the same. The catalysts are of the formula

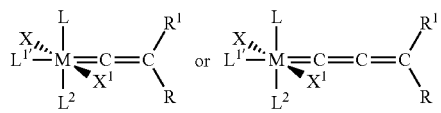

wherein
M is ruthenium or osmium;
X and $X^1$ are the same or different and are each independently an anionic ligand
L, $L^{1'}$ and $L^2$ are the same or different and are each independently a neutral electron donor ligand; and
R and $R^1$ are each independently hydrogen or a substituent selected from alkyl, alkenyl, alkynyl, aryl, carboxylate, alkoxy, alkenyloxy, alynyloxy, aryloxy, alkoxycarbonyl, alkylthio, alkylsulfonyl, alkylsulfinyl and silyl.

The catalysts are useful in metathesis reactions including ring-opening metathesis polymerization, ring-closing metathesis, ADMET, self- and cross-metathesis reactions, alkyne polymerization, carbonyl olefination, depolymerisation of unsaturated polymers, synthesis of telechelic polymers, and olefin synthesis. All examples in WO-A1-03/011455 disclose polymerization reactions.

WO-A2-03/087167 relates to a method for carrying out cross-metathesis reactions using Group 8 transition metal complexes as catalyst. The process according to WO-A2-03/087167 is especially useful for the synthesis of olefins that are directly substituted with an electron withdrawing group via a cross-metathesis reaction. The Group 8 transition metal complexes have the following formula (I)

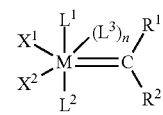

in which
$L^1$ is a strongly coordinating neutral electron donor ligand;
n is zero or 1;
$L^2$ and $L^3$ are weakly coordinating neutral electron donor ligands;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups, or may be taken together to form a cyclic group,
and further wherein any one or more of $X^1$, $X^2$, $L^1$, $L^2$, $L^3$, $R^1$, and $R^2$ may be attached to a support;
or one of the following formulae (II), (III) or (IV)

(II)

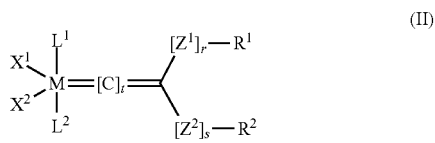

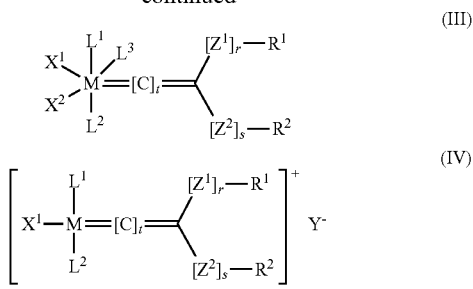

wherein
$X^1$, $X^2$, $L^1$, $L^2$, $L^3$, $R^1$, and $R^2$ are as defined previously, r and s are independently zero or 1, t is an integer in the range of zero to 5, Y is any noncoordinating anion, $Z^1$ and $Z^2$ are linkages containing 1 to about 6 spacer atoms, any two or more of $X^1$, $X^2$, $L^1$, $L^2$, $L^3$, $Z^1$, $Z^2$, $R^1$, and $R^2$ may be taken together to form a cyclic group; e.g., a multidentate ligand, and any one or more of $X^1$, $X^2$, $L^1$, $L^2$, $L^3$, $Z^1$, $Z^2$, $R^1$, and $R^2$ may be attached to a support.

According to the example in WO-A2-03/087167 a cross-metathesis of acrylonintrile with different cross partners is carried out in the presence of a catalyst of the formula (I)

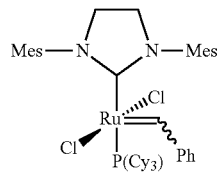

However, the catalysts mentioned above are not necessarily suitable for carrying out the degradation of nitrile rubber. Further, the catalysts mentioned above have never been used as hydrogenation catalysts in the prior art.

In WO-A-2005/080456 Guerin reports the preparation of hydrogenated nitrile rubber polymers having low molecular weights and narrower molecular weight distributions than those known in the art. The preparation process is carried out by simultaneously subjecting the nitrile rubber to a metathesis reaction and a hydrogenation reaction. The reaction according to WO 2005/080456 takes place in the presence of a ruthenium based catalyst of the general formula 1,3 bis(2, 4,6-trimethylphenyl)-2-imidazolidinylidene) (tricyclohexylphosphine) ruthenium (phenylmethylene) dichloride (Grubbs $2^{nd}$ generation catalyst)

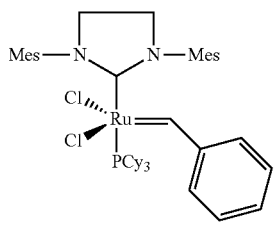

However, there is a need for alternative catalysts which are suitable for the preparation of hydrogenated nitrile rubber polymers in a simultaneous hydrogenation and metathesis reaction. Additionally, the hydrogenation efficiency and—at the same time—the metathesis activity should be improved.

We have now discovered that hydrogenated nitrile rubber having lower molecular weights and narrower molecular weight distributions than those known in the art can be prepared by the metathesis of nitrile butadiene rubber in the presence of hydrogen and optionally at least one co-(olefin). Thus, the inventive process is capable of producing a hydrogenated nitrile rubber with low residual double bond contents (RDB) having a molecular weight ($M_w$) in the range of from 20,000 to 250,000, a Mooney viscosity (ML 1+4 @ 100 deg. C.) of in the range of from 1 to 50, and a MWD (or polydispersity index) of less than 2.8 in a single step.

The present invention therefore relates to a process for the production of a hydrogenated nitrile rubber comprising reacting a nitrile rubber in the presence of hydrogen, optionally at least one co-olefin, and in the presence of at least one catalyst of the general formulae (I), (II) or (III),

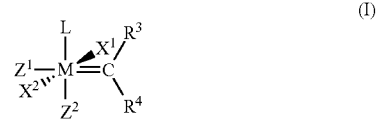

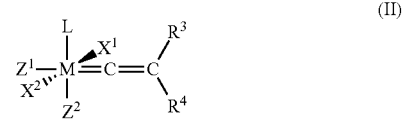

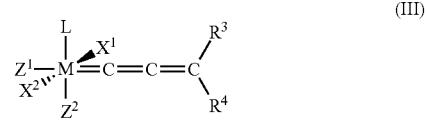

where
M is ruthenium or osmium,
$X^1$ and $X^2$ are identical or different ligands, preferably anionic ligands,
$Z^1$ and $Z^2$ are identical or different and neutral electron donor ligands,
$R^3$ and $R^4$ are each independently hydrogen or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl and alkylsulphinyl radical, each of which may optionally be substituted by one or more alkyl, halogen, alkoxy, aryl or heteroaryl radicals, and
L is a ligand.

As nitrile rubbers ("NBR"), it is possible to use copolymers or terpolymers which comprise repeating units of at least one conjugated diene, at least one α,β-unsaturated nitrile and, if desired, one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrite, it is possible to use any known α,β-unsaturated nitrite, preferably a ($C_3$-$C_5$) α,β-unsaturated nitrite such as acrylonitrile, methacrylonitrile, ethacrylonitrile or mixtures thereof. Particular preference is given to acrylonitrile.

A particularly preferred nitrite rubber is thus a copolymer of acrylonitrile and 1,3-butadiene.

Apart from the conjugated diene and the α,β-unsaturated nitrite, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethythexyl acrylate, 2-ethythexyl methacrylate and octyl acrylate. Particularly preferred alkoxyalkyl esters of α,β-unsaturated carboxylic acids are methoxyethyl (meth)acrylate, ethoxyethyl (meth)acrylate and methoxymethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrite in the NBR polymers to be used can vary within wide ranges. The proportion of or of the sum of the conjugated dienes is usually in the range from 40 to 90% by weight, preferably in the range from 55 to 75% by weight, based on the total polymer. The proportion of or of the sum of the α,β-unsaturated nitrites is usually from 10 to 60% by weight, preferably from 25 to 45% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrite or nitrites are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

The nitrile rubbers used for the hydrogenation/metathesis usually have a Mooney viscosity (ML 1+4 at 100° C.) in the range from 24 to 70, preferably from 28 to 40. This corresponds to a weight average molecular weight $M_w$ in the range 200 000-500 000, preferably in the range 200 000-400 000. The nitrile rubbers used usually also have a polydispersity $PDI=M_w/M_n$, where $M_w$ is the weight average molecular weight and $M_n$ is the number average molecular weight, in the range 2.0-6.0 and preferably in the range 2.0-4.0.

The determination of the Mooney viscosity is carried out in accordance with ASTM standard D 1646.

According to the invention the substrate is simultaneously subject to a metathesis reaction and a hydrogenation reaction.

The catalysts of the general formula (I)-(III) are known in principle. Representatives of this class of compounds are the catalysts described by Grubbs et al. in WO 2003/011455 A1, Grubbs et al. WO 2003/087167 A2, Organometallics 2001, 20, 5314 and Angew. Chem. Int. Ed. 2002, 41, 4038. The catalysts are commercially available or can be prepared as described in the references cited.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of radicals, parameters or explanations given above or below in general terms or in preferred ranges can be combined with one another in any way, i.e. including combinations of the respective ranges and preferred ranges.

$Z^1$ and $Z^2$

In the process of the present invention $Z^1$ and $Z^2$ in the catalysts of general formulae (I), (II) and (III) are identical or different ligands being neutral electron donor ligands. Such ligands are in general weakly coordinating. Typically they represent optionally substituted heterocyclic groups. They may represent five- or six-membered monocyclic groups containing 1 to 4, preferably 1 to 3, most preferably 1 or 2 heteroatoms, or bicyclic or polycyclic structures composed of 2, 3, 4 or 5 such five- or six-membered monocyclic groups wherein all aforementioned groups are optionally substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl radicals where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

Examples of $Z^1$ and $Z^2$ include, without limitation: nitrogen containing heterocycles such as pyridine, pyridazine, bipyridine, pyrimidine, pyrazine, pyrazolidine, pyrrolidine, piperazine, indazole, quinoline, purine, acridine, bisimidazole, picolylimine, imidazolidine and pyrrole, wherein all aforementioned groups are optionally substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl radicals where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

$Z^1$ and $Z^2$ together may also represent a bidentate ligand, thereby forming a cyclic structure.

L

In the catalysts of the general formulae (I), (II) and (III), L is a ligand, usually a ligand having an electron donor function.

The ligand L can, for example, be a phosphine, sulphonated phosphine, phosphate, phosphinite, phosphonite, arsine, stilbine, ether, amine, amide, sulphoxide, carboxyl, nitrosyl, pyridine, thioether or L can be an unsubstituted or substituted imidazolidine ("Im") ligand.

Preference is given to ligand L being a $C_6$-$C_{24}$-arylphosphine, $C_1$-$C_6$-alkylphosphine or $C_3$-$C_{10}$-cycloalkylphosphine ligand, a sulphonated $C_6$-$C_{24}$-arylphosphine or a sulphonated $C_1$-$C_{10}$-alkylphosphine ligand, a $C_6$-$C_{24}$-aryl phosphinite or $C_1$-$C_{10}$-alkyl phosphinite ligand, a $C_6$-$C_{24}$-aryl phosphonite or $C_1$-$C_{10}$-alkyl phosphonite ligand, a $C_6$-$C_{24}$-aryl phosphite or $C_1$-$C_{10}$-alkylphosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which may in turn be substituted by a halogen, $C_1$-$C_5$ alkyl radical or $C_1$-$C_5$-alkoxy radical, or L is a unsubstituted or substituted imidazolidine ("Im") ligand.

Aryl encompasses an aromatic radical having from 6 to 24 skeletal carbon atoms ($C_6$-$C_{24}$-aryl). Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

Alkyl is preferably $C_1$-$C_{12}$-alkyl and is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl, n-heptyl, n-octyl, n-decyl or n-dodecyl.

Cycloalkyl is preferably $C_3$-$C_{10}$-Cycloalkyl and encompasses cyclopropyl, cyclobutyl, cyclopentyl, cyclohexyl, cycloheptyl and cyclooctyl.

The term phosphine includes $PR_3$ structures, wherein R is in each case independently of one another $C_1$-$C_6$-alkyl, $C_3$-$C_8$-cycloalkyl or aryl, like for example, $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4\text{—}SO_3Na)_3$, $P(CH_2C_6H_4\text{—}SO_3Na)_3$, $P(iso\text{-}Pr)_3$, $P(CHCH_3(CH_2CH_3))_3$, $P(cyclopentyl)_3$, $P(cyclohexyl)_3$, $P(neopentyl)_3$ and $P(neophenyl)_3$.

Phosphinite includes, for example, triphenyl phosphinite, tricyclohexyl phosphinite, triisopropyl phosphinite and methyl diphenylphosphinite.

Phosphite includes, for example, triphenyl phosphite, tricyclohexyl phosphite, tri-tert-butyl phosphite, triisopropyl phosphite and methyl diphenyl phosphite.

Stilbine includes, for example, triphenylstibine, tricyclohexylstibine and trimethylstibene.

Sulphonate includes, for example, trifluoromethanesulphonate, tosylate and mesylate.

Sulphoxide includes, for example, $CH_3S(\text{=}O)CH_3$ and $(C_6H_5)_2SO$.

Thioether includes, for example, $CH_3SCH_3$, $C_6H_5SCH_3$, $CH_3OCH_2CH_2SCH_3$ and tetrahydrothiophene.

The imidazolidine radical (Im) usually has a structure of the general formula (IVa) or (IVb),

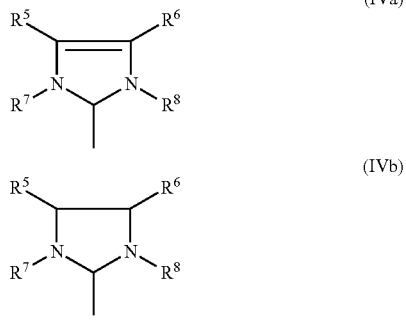

where
R$^5$, R$^6$, R$^7$, R$^8$ are identical or different and are each hydrogen, straight-chain or branched $C_1$-$C_{30}$-alkyl, preferably $C_1$-$C_{20}$-alkyl, $C_3$-$C_{20}$-cycloalkyl, preferably $C_3$-$C_{10}$-cycloalkyl, $C_2$-$C_{20}$-alkenyl, preferably $C_2$-$C_{10}$-alkenyl, $C_2$-$C_{20}$-alkynyl, preferably $C_2$-$C_{10}$-alkynyl, $C_6$-$C_{24}$-aryl, preferably $C_6$-$C_{14}$-aryl, $C_1$-$C_{20}$-carboxylate, preferably $C_1$-$C_{10}$-carboxylate, $C_1$-$C_{20}$-alkoxy, preferably $C_1$-$C_{10}$-alkoxy, $C_2$-$C_{20}$-alkenyloxy, preferably $C_2$-$C_{10}$-alkenyloxy, $C_2$-$C_{20}$-alkynyloxy, preferably $C_2$-$C_{10}$-alkynyloxy, $C_6$-$C_{24}$-aryloxy, preferably $C_6$-$C_{14}$-aryloxy, $C_2$-$C_{20}$-alkoxycarbonyl, preferably $C_2$-$C_{10}$-alkoxycarbonyl, $C_1$-$C_{20}$-alkylthio, preferably $C_1$-$C_{10}$-alkylthio, $C_6$-$C_{24}$-arylthio, preferably $C_6$-$C_{14}$-arylthio, $C_1$-$C_{20}$-alkylsulphonyl, preferably $C_1$-$C_{10}$-alkylsulphonyl $C_1$-$C_{20}$-alkylsulphonate, preferably alkylsulphonate, $C_6$-$C_{24}$-arylsulphonate, preferably $C_6$-$C_{14}$-arylsulphonate, or $C_1$-$C_{20}$-alkylsulphinyl, preferably $C_1$-$C_{10}$-alkylsulphinyl.

One or more of the radicals R$^5$, R$^6$, R$^7$, R$^8$ may, independently of one another, optionally be substituted by one or more substituents, preferably straight-chain or branched $C_1$-$C_{10}$-alkyl, $C_3$-$C_8$-cycloalkyl $C_1$-$C_{10}$-alkoxy or $C_6$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

Only for the sake of clarity it is hereby confirmed that the structures as depicted in the general formulae (IVa) and (IVb) of this application with regard to the structure of the imidazolidine radical shall have the same meaning as the structures often used in the relevant literature with regard to such imidazolidine radical which are hereinafter depicted as structures (IVa') and (IVb') and which emphasize the carbene-like structure of the imidazolidine radical. The same shall apply to the structures (Va)-(Vf) which are also later on depicted in this application.

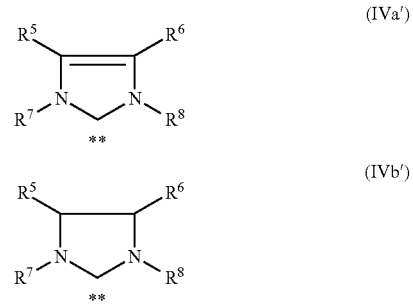

In a preferred embodiment of the catalysts of the general formula (I), (II) or (III) a ligand L is present in which R$^5$ and R$^6$ are each, independently of one another, hydrogen, $C_6$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

The radicals R$^7$ and R$^8$ in the ligand L of the catalysts of the general formulae (I), (II) or (III) are preferably identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

These radicals R$^7$ and R$^8$ which are mentioned above as being preferred may optionally be substituted by one or more further radicals selected from the group consisting of straight-chain or branched $C_1$-$C_5$-alkyl, in particular methyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In particular, the radicals $R^7$ and $R^8$ are identical or different and are each i-propyl, neopentyl, adamantyl or mesityl.

Particularly preferred imidazolidine radicals (Im) have the structures (Va)-(Vf), where Mes is in each case a 2,4,6-trimethylphenyl radical.

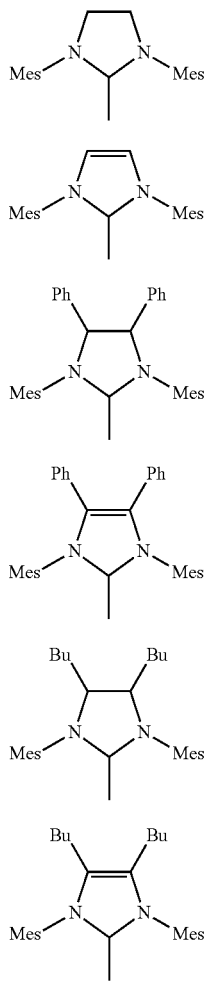

$R^3$ and $R^4$

The radicals $R^3$ and $R^4$ of the catalysts of general formulae (I), (II) and (III) used in the process of the present invention are identical or different and are each hydrogen or alkyl, preferably $C_1$-$C_{30}$-alkyl, more preferably $C_1$-$C_{20}$-alkyl, cycloalkyl, preferably $C_3$-$C_{20}$-cycloalkyl, more preferable $C_3$-$C_8$-cycloalkyl alkenyl, preferably $C_2$-$C_{20}$-alkenyl, more preferable $C_2$-$C_{16}$-alkenyl, alkynyl, preferably $C_2$-$C_{20}$-alkynyl, more preferably $C_2$-$C_{16}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl radical, each of which may optionally be substituted by one or more alkyl, halogen, alkoxy, aryl or heteroaryl radicals.

$X^1$ and $X^2$ $X^1$ and $X^2$ of the catalysts of general formulae (I), (II) and (III) used in the process of the present invention are identical or different ligands, preferably anionic ligands. In the literature, the customary term "anionic ligands" always refers, in the context of such metathesis catalysts, to ligands which, when they are regarded separately from the metal centre, would be negatively charged for a closed electron shell.

In the catalysts of the general formulae (I), (II) and (III), $X^1$ and $X^2$ are identical or different and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl radicals, where the latter radicals may optionally also in turn be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

Particular preference is given to a process according to the invention which is carried out in the presence of at least one catalyst of the general formula (I) in which M is ruthenium, $X^1$ and $X^2$ are both halogen, in particular, both chlorine, $Z^1$ and $Z^2$ are identical or different and represent five- or six-membered monocyclic groups containing 1 to 4, preferably 1 to 3, most preferably 1 or 2 heteroatoms, or bicyclic or polycyclic structures composed of 2, 3, 4 or 5 such five- or six-membered monocyclic groups wherein all aforementioned groups are optionally substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$ heteroaryl radicals, or $Z^1$ and $Z^2$ together represent a bidentate ligand, thereby forming a cyclic structure, $R^3$ and $R^4$ are identical or different and are each hydrogen or $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphinyl, each of which may optionally be substituted by one or more alkyl, halogen, alkoxy, aryl or heteroaryl radicals, and L has a structure of the general formula (IVa) or (IVb),

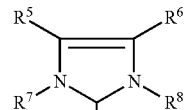
(IVa)

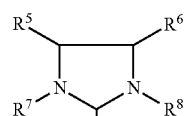
(IVb)

where $R^5$, $R^6$, $R^7$, $R^8$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{20}$-arylsulphonate, or $C_1$-$C_{20}$-alkylsulphinyl.

A particularly preferred catalyst which comes under the general structural formula (I) is that of the formula (VI)

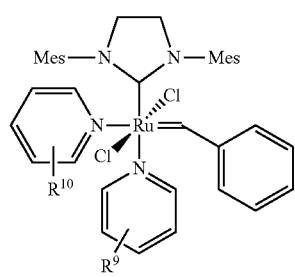
(VI)

where $R^9$, $R^{10}$ are identical or different and represent halogen, straight-chain or branched $C_1$-$C_{20}$ alkyl, $C_1$-$C_{20}$ heteroalkyl, $C_1$-$C_{10}$ haloalkyl, $C_1$-$C_{10}$ alkoxy, $C_6$-$C_{24}$ aryl, preferably phenyl, formyl, nitro, nitrogen heterocycles, preferably pyridine, piperidine and pyrazine, carboxy, alkylcarbonyl, halocarbonyl, carbamoyl, thiocarbomoyl, carbamido, thioformyl, amino, trialkylsilyl and trialkoxysilyl.

The aforementioned alkyl, heteroalkyl, haloalkyl, alkoxy, phenyl, nitrogen heterocycles, alkylcarbonyl, halocarbonyl, carbamoyl, thiocarbamoyl and amino radicals may optionally also in turn be substituted by one or more substituents selected from the group consisting of halogen, preferably fluorine, chlorine, or bromine, $C_1$-$C_5$-alkyl, $C_1$-$C_5$-alkoxy and phenyl.

In a particularly preferred embodiment the catalyst (VI) has the general structural formula (VIa) or (VIb), wherein $R^9$ and $R^{10}$ have the same meaning as given for structural formula (VI)

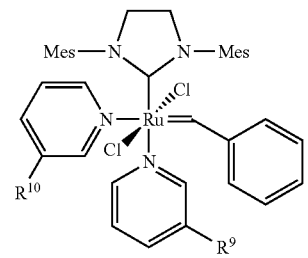
(VIa)

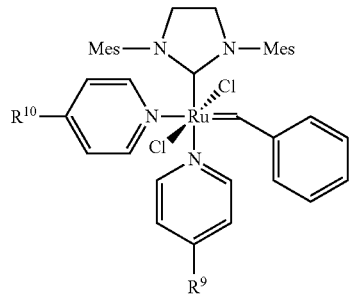
(VIb)

In the case where $R^9$ and $R^{10}$ are each hydrogen, catalyst (VI) is referred to as "Grubbs III catalyst" in the literature.

Further suitable catalysts which come under the general structural formulae (I)-(III) are those of the formulae (VII), (VIII), (IX), (X), (XI), (XII), (XIII), (XIV), (XV) and (XVI), where Mes is in each case a 2,4,6-trimethylphenyl radical.

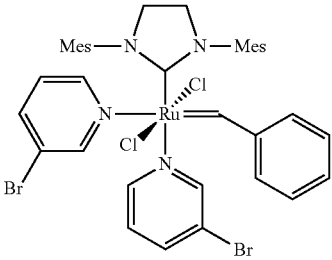
(VII)

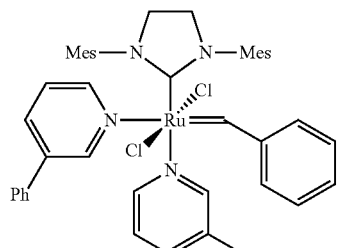
(VIII)

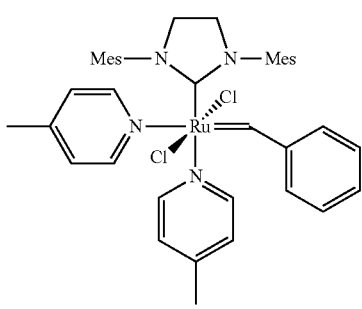
(IX)

(X)
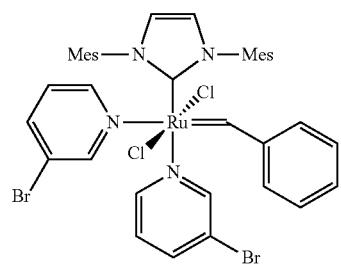

(XI)
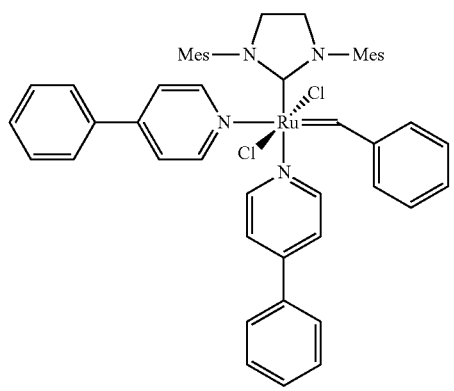

(XII)
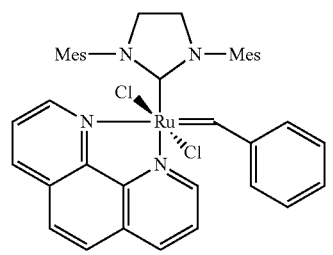

(XIII)
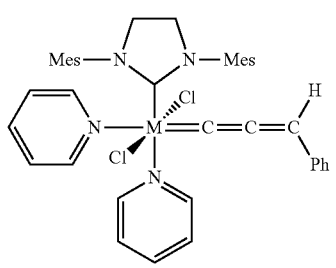

(XIV)
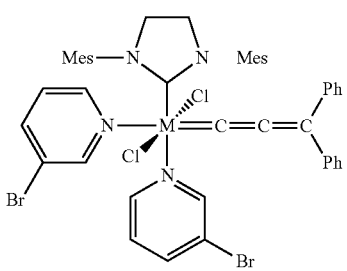

(XV)
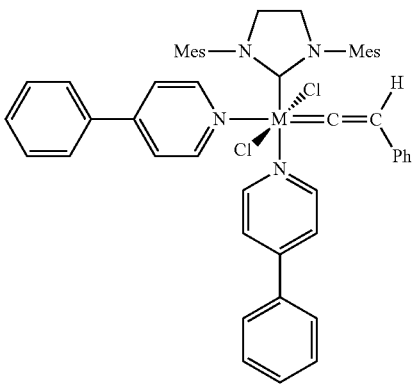

(XVI)
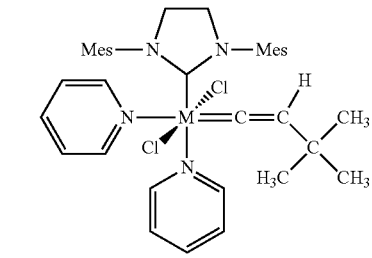

All the abovementioned catalysts of the formulae (I)-(III) and (VI)-(XVI) can either be used as such for the simultaneous metathesis and hydrogenation of NBR or can be applied to and immobilized on a solid support. As solid phases or supports, it is possible to use materials which firstly are inert towards the reaction mixture of the metathesis and secondly do not impair the activity of the catalyst. It is possible to use, for example, metals, glass, polymers, ceramic, organic polymer spheres, inorganic sol-gels, silica, silicates, calcium carbonate or barium sulfate for immobilizing the catalyst.

The catalysts of all the abovementioned general and specific formulae (I)-(III) and (VI)-(XVI) are highly suitable for the simultaneous metathesis and hydrogenation of nitrile rubber.

The amount of at least one catalyst of the formulae (I), (II), (III) or (VI) to (XVI) used according to the invention for the simultaneous metathesis and hydrogenation depends on the nature and the catalytic activity of the specific catalyst. The amount of catalyst used is usually from 5 to 1000 ppm of noble metal, preferably from 5 to 500 ppm, in particular from 5 to 250 ppm, more preferably from 5 to 100 ppm, based on the nitrile rubber used.

The process of the present invention (simultaneous metathesis and hydrogenation of NBR) can optionally be carried out with a coolefin. Suitable coolefins are, for example, ethylene, propylene, isobutene, styrene, 1-hexene and 1-octene.

The process of the present invention (simultaneous metathesis and hydrogenation of NBR) can be carried out in a suitable solvent which does not deactivate the catalyst used and also does not adversely affect the reaction in any other way. Preferred solvents include but are not restricted to dichloromethane, benzene, toluene, methyl ethyl ketone, acetone, tetrahydrofuran, tetrahydropyran, dioxane and cyclohexane. The particularly preferred solvent is chlorobenzene.

The concentration of NBR in the reaction mixture is not critical but, obviously, should be such that the reaction is not hampered if the mixture is too viscous to be stirred efficiently, for example. Preferably, the concentration of NBR is in the range of from 1 to 40% by weight, most preferably in the range of from 6 to 15 wt. %.

The concentration of hydrogen is usually between 100 psi and 2000 psi, preferably 800 psi and 1400 psi.

The process is preferably carried out at a temperature in the range of from 60 to 200° C.; preferably in the range of from 100 to 140° C.

The reaction time will depend upon a number of factors, including cement concentration, amount of catalyst used and the temperature at which the reaction is performed. The progress of the reaction may be monitored by standard analytical techniques, for example using GPC or solution viscosity. Whenever referenced throughout the specification the molecular weight distribution of the polymer was determined by gel permeation chromatography (GPC) carried out according to DIN 55672-1 version 2007.

Hydrogenation in this invention is understood by preferably more than 50% of the residual double bonds (RDB) present in the starting nitrile polymer being hydrogenated, preferably more than 90% of the RDB are hydrogenated, more preferably more than 95% of the RDB are hydrogenated and most preferably more than 99% of the RDB are hydrogenated.

Due to the low viscosity of the resulting HNBR, it is ideally suited to be processed by but not limited to injection molding technology. The polymer can also be useful to transfer molding, to compression molding, or to liquid injection molding.

Further, the polymer obtained in the process of the present invention is very well suited for the manufacture of a shaped article, such as a seal, hose, bearing pad, stator, well head seal, valve plate, cable sheathing, wheel, roller, pipe seal, in place gaskets or footwear component prepared by injection molding technology.

In a further embodiment the present invention relates to the use of at least one catalyst of the general formulae (I), (II) or (III),

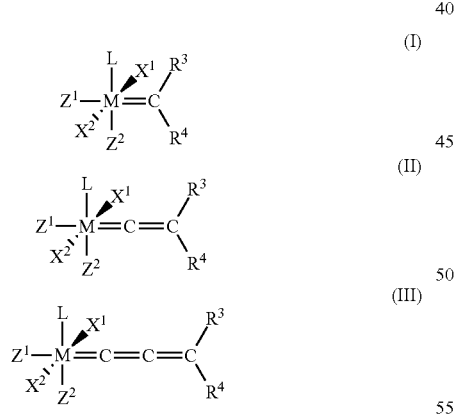

where
M is ruthenium or osmium,
$X^1$ and $X^2$ are identical or different ligands, preferably anionic ligands,
$Z^1$ and $Z^2$ are identical or different and neutral electron donor ligands,
$R^3$ and $R^4$ are each independently hydrogen or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl and alkylsulphinyl radical, each of which may optionally be substituted by one or more alkyl, halogen, alkoxy, aryl or heteroaryl radicals, and
L is a ligand
in a process for the production of a hydrogenated nitrile rubber by simultaneous hydrogenantion and metathesis of a nitrile rubber.

Preferred groups M, $X^1$, $X^2$, $Z^1$, $Z^2$, $R^3$, $R^4$ and L as well as particularly preferred compounds of the general formulae (I), (II) and (III) are mentioned before.

EXAMPLES

Examples 1-2

The following catalysts were used:
"Grubbs III Catalyst" (According to the Invention):

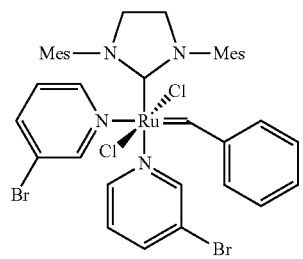

The Grubbs III catalyst was produced via the preparation outlined in Grubbs et al., Angew. Chem. Int. Ed., 2002, 41(21), 4035.

Wilkinson's Catalyst (Comparison):

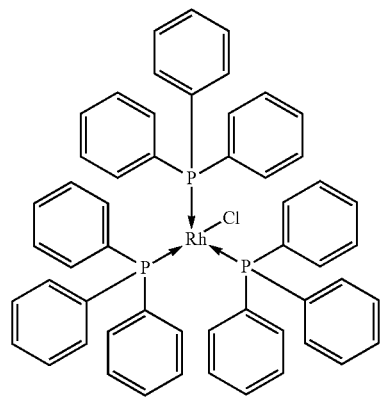

The Wilkinson's catalyst was procured from Umicore AG.

Grubbs II Catalyst (Comparison):

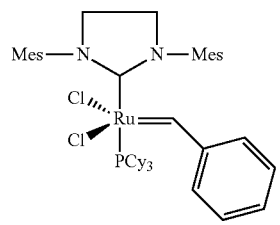

The Grubbs II catalyst was procured from Materia (Pasadena/California).

The degradation reactions described below were carried out using the nitrile rubber Perbunan® NT 3429 from Lanxess Deutschland GmbH. This nitrile rubber had the following characteristic properties:
Acrylonitrile content: 34% by weight
Mooney viscosity (ML 1+4 @100° C.): 28 Mooney units
Residual moisture content: <0.5% by weight
$M_w$: 214 000 g/mol
$M_n$: 67 000 g/mol
PDI ($M_w/M_n$): 3.2

In the text that follows, this nitrile rubber is referred to as NBR for short.

518 grams of nitrile rubber were dissolved in 4300 grams of monochlorobenzene at room temperature and agitated for 12 hours. The 12% solution was than transferred to a high pressure reactor agitating at 600 rpm, where the rubber solution was degassed 3 times with $H_2$ (7 bar) under full agitation. The temperature of the reactor was raised to 130° C. and a monochlorobenzene solution containing the catalyst and triphenylphosphine (if needed) was added to the reactor. The pressure was set to 85 bar and the temperature was allowed to increase to 138° C. and maintained constant for the duration of the reaction. The hydrogenation reaction was monitored by measuring the residual double bond (RDB) level at various intervals using IR spectroscopy.

On completion of the reaction GPC analysis was carried out according to DIN 55672-1 version 2007.

The Mooney viscosity (ML 1+4 @100° C.) was determined utilizing ASTM standard D 1646.

The following characteristic properties were determined by means of GPC analysis both for the original NBR rubber (before degradation) and for the degraded nitrile rubbers:
$M_w$ [kg/mol]: weight average molar mass
$M_n$ [kg/mol]: number average molar mass
PDI: width of the molar mass distribution ($M_w/M_n$)

Example 1

Details

TABLE 1

Comparison of Hydrogenation Parameters

| | HNBR 1 | HNBR 2 | HNBR 3 | HNBR 4 |
|---|---|---|---|---|
| Hydrogenation Catalyst | Grubbs III | Grubbs III | Wilkinson's | Grubbs II |
| Catalyst Amount (phr) | 0.057 | 0.080 | 0.06 | 0.055 |
| Metal content (ppm) | 65.6 | 91.3 | 65.6 | 65.6 |

TABLE 2

Comparison of Hydrogenation Profiles

| Reaction Time (min) | HNBR 1 RDB % | HNBR 2 RDB % | HNBR 3 RDB % | HNBR 4 RDB % |
|---|---|---|---|---|
| 0 | 100 | 100 | 100 | 100 |
| 60 | 2.0 | 0.7 | 15.4 | 2.9 |
| 120 | 0.4 | 0.5 | 3.1 | 0.6 |
| 180 | 0.3 | 0.3 | 1.3 | 0.3 |
| 240 | — | — | 0.6 | — |

TABLE 3

Summary of HNBR Properties

| | Mw (g/mol) | Mn (g/mol) | PDI (Mw/Mn) | Mooney Viscosity |
|---|---|---|---|---|
| HNBR 1 | 191541 | 68643 | 2.79 | 38.2 |
| HNBR 2 | 135772 | 58259 | 2.33 | 20.2 |
| HNBR 3 | 195304 | 64130 | 3.05 | 69.3 |
| HNBR 4 | 144212 | 59851 | 2.45 | 32.6 |

In comparing HNBR's 1, 3 and 4 all at equal metal contents, we observe that the Grubbs III catalyst hydrogenates faster in the first 120 min than either the reaction with Grubbs II or Wilkinson's catalyst.

What is claimed is:

1. A process for the production of a hydrogenated nitrile rubber, the process comprising simultaneously hydrogenating and metathesizing nitrite rubber in the presence of hydrogen, at least one catalyst, and optionally at least one co-olefin, wherein each at least one catalyst is capable of catalyzing both the hydrogenating and metathesizing, and catalyzes the hydrogenating and metathesizing of the nitrite rubber, and each at least one catalyst is selected from the group consisting of compounds of general formulae (I), (II) or (III),

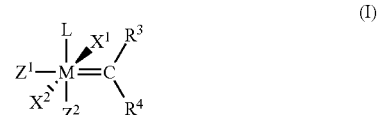

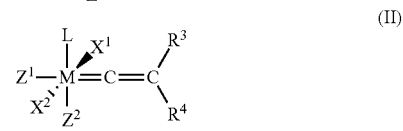

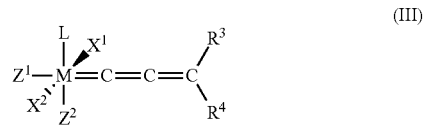

where
M is ruthenium or osmium,
$X^1$ and $X^2$ are identical or different anionic ligands,
$Z^1$ and $Z^2$ are identical or different neutral electron donor ligands,
$R^3$ and $R^4$ are each independently hydrogen or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl and alkylsulphinyl radical, each of which may optionally be substituted by one or more alkyl, halogen, alkoxy, aryl or heteroaryl radicals, and
L is a ligand.

2. The process according to claim 1, wherein in the at least one catalyst of the general formulae (I), (II) or (III), $Z^1$ and $Z^2$ are identical or different and represent optionally substituted heterocyclic groups, optionally substituted by one or more alkyl, cycloalkyl, alkoxy, halogen, aryl, or heteroaryl, where these abovementioned substituents may in turn be substituted by one or more radicals.

3. The process according to claim 1 or 2, wherein in the at least one catalyst of the general formulae (I), (II) or (III), the ligand L is a phosphine, a sulphonated phosphine, phosphate, phosphinite, phosphorite, arsine, stibine, ether, amine, amide, sulphoxide, carboxyl, nitrosyl, pyridine, thioether or L is a substituted or unsubstituted imidazolidine ("Im") ligand, each of which may be substituted by a phenyl group which may in turn be substituted by a halogen, $C_1$-$C_5$ alkyl radical or $C_1$-$C_5$-alkoxy radical, or L is a substituted or unsubstituted imidazolidine ("Im") ligand.

4. The process according to claim 3, wherein in the at least one catalyst of the general formulae (I), (II) or (III), L is selected from the group consisting of $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4SO_3Na)_3$, $P(CH_2C_5H_4\text{---}SO_3Na)_3$, $P(\text{iso-Pr})_3$, $P(CHCH_3(CH_2CH_3))_3$, $P(\text{cyclopentyl})_3$, $P(\text{cyclohexyl})_3$, $P(\text{neopentyl})_3$ and $P(\text{neophenyl})_3$.

5. The process according to claim 3, wherein the imidazolidine radical (Im) has a structure of the general formula (IVa) or (IVb),

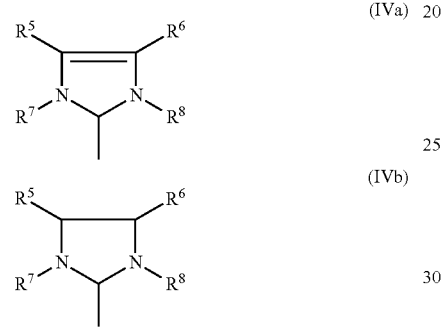

where
$R^5$, $R^6$, $R^7$, $R^8$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate, or $C_1$-$C_{20}$-alkylsulphinyl.

6. The process according to claim 1 or 2, wherein in the at least one catalyst of the general formulae (I), (II) or (Ill), $R^3$ and $R^4$ are identical or different and are each hydrogen or an alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphinyl, each of which may optionally be substituted by one or more alkyl, halogen, alkoxy, aryl or heteroaryl radicals.

7. The process according to claim 1 or 2, wherein at least one catalyst of the general formulae (I), (II) or (Ill), $X^1$ and $X^2$ are identical or different and represent hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl.

8. The process according to claim 1 or 2, wherein in at least one catalyst of the general formulae (I), (II) or (Ill), M is ruthenium,
$X^1$ and $X^2$ are both halogen,
$Z^1$ and $Z^2$ are identical or different and represent five- or six-membered monocyclic groups containing 1 to 4 heteroatoms, or bicyclic or polycyclic structures composed of 2, 3, 4 or 5 such five- or six-membered monocyclic groups wherein all aforementioned groups are optionally substituted by one or more alkyl, cycloalkyl, alkoxy, halogen, aryl, or heteroaryl, or $Z^1$ and $Z^2$ together represent a bidentate ligand, thereby forming a cyclic structure, $R^3$ and $R^4$ are identical or different and are each hydrogen, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphinyl, each of which may optionally be substituted by one or more alkyl, halogen, alkoxy, aryl or heteroaryl radicals, and L has a structure of the general formula (IVa) or (IVb),

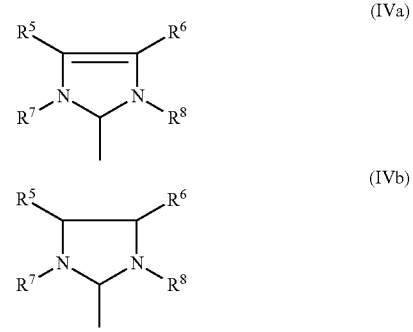

where
$R^5$, $R^6$, $R^7$, $R^8$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate, or $C_1$-$C_{20}$-alkylsulphinyl.

9. The process according to claim 1, wherein at least one catalyst of formula (I) is at least one catalyst of formula (VI),

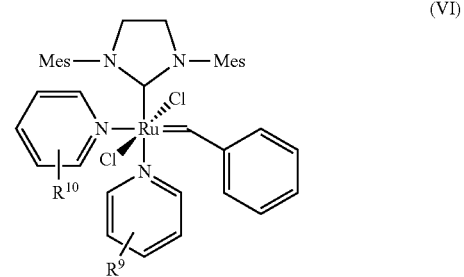

where
$R^9$ and $R^{10}$ are identical or different and represent halogen, straight-chain or branched $C_1$-$C_{20}$ alkyl, $C_1$-$C_{20}$ heteroalkyl, $C_1$-$C_{10}$ haloalkyl, $C_1$-$C_{10}$ alkoxy, $C_6$-$C_{24}$ aryl, formyl, nitro, nitrogen heterocycles, carboxy, alkylcarbonyl, halocarbonyl, carbamoyl, thiocarbomoyl, carbamido, thioformyl, amino, trialkylsilyl and trialkoxysilyl.

10. The process according to claim 1, wherein at least one catalyst of formulae (I), (II) or (III) is at least one catalyst of formulae (VII), (VIII), (X), (X), (XI), (XII), (XIII), (XIV), (XV) or (XVI), where Mes is in each case a 2,4,6-trimethylphenyl radical

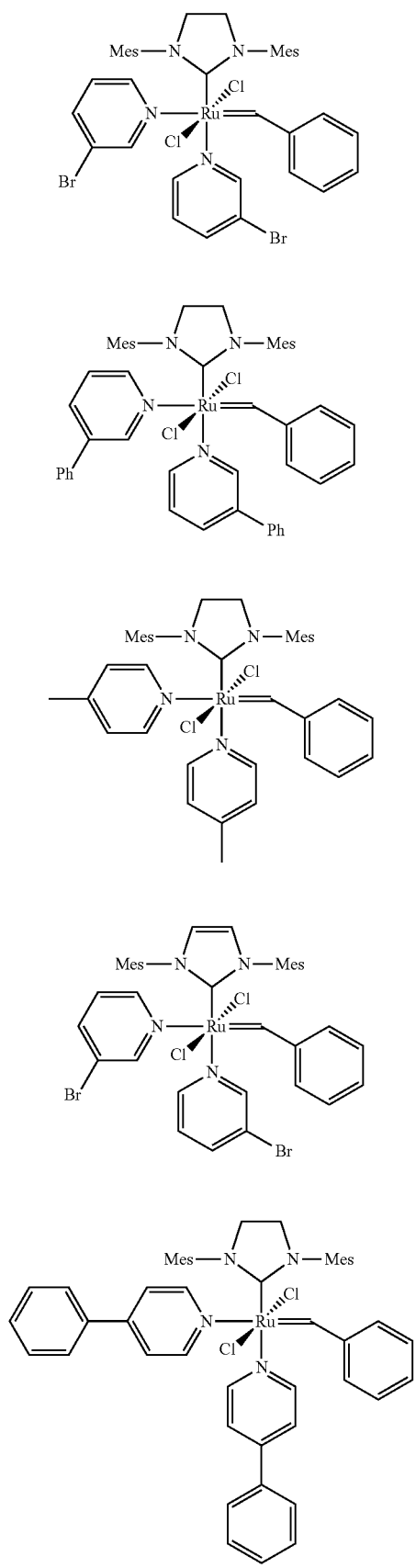
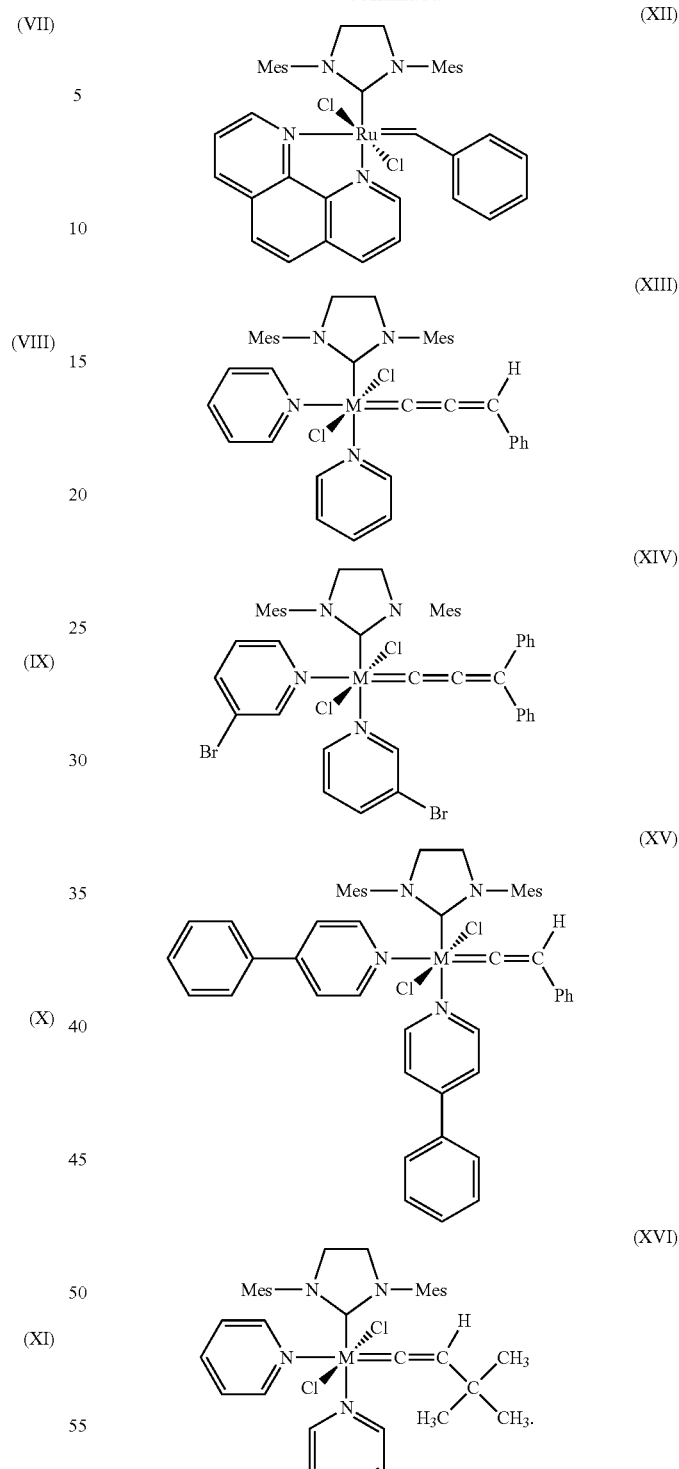
11. The process according to claim 1 or 2, in which the amount of catalyst is from 5 to 1000 ppm of noble metal, based on the nitrile rubber used.
12. A process according to claim 1 or 2, wherein the process is carried out with at least one co-olefin.
13. A process according to claim 1 or 2, wherein the hydrogenation reaction is carried out in at least one suitable solvent which does not deactivate the catalyst used and also does not adversely affect the reaction in any other way.

14. A process for the production of a hydrogenated nitrile rubber, the process comprising simultaneously hydrogenating and metathesizing nitrile rubber in the presence of hydrogen, at least one catalyst, and optionally at least one co-olefin, wherein each catalyst is a catalyst of formula (VI),

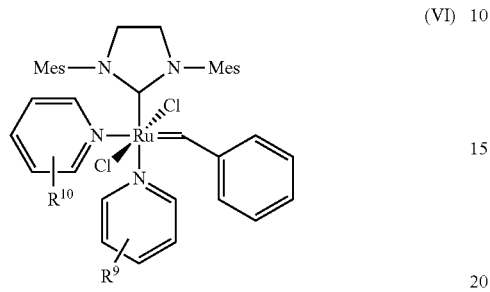

(VI)

where $R^9$ and $R^{10}$ are identical or different and represent halogen, straight-chain or branched $C_1$-$C_{20}$ alkyl, $C_1$-$C_{20}$ heteroalkyl, $C_1$-$C_{10}$ haloalkyl, $C_1$-$C_{10}$ alkoxy, $C_6$-$C_{24}$ aryl, formyl, nitro, nitrogen heterocycles, carboxy, alkylcarbonyl, halocarbonyl, carbamoyl, thiocarbomoyl, carbamido, thioformyl, amino, trialkylsilyl and trialkoxysilyl, and wherein the catalyst is capable of catalyzing both the hydrogenating and metathesizing, and catalyzes the hydrogenating and metathesizing of the nitrite rubber.

* * * * *